No. 770,070. PATENTED SEPT. 13, 1904.
A. JOHNSON.
COLLAR.
APPLICATION FILED MAR. 12, 1904.
NO MODEL.
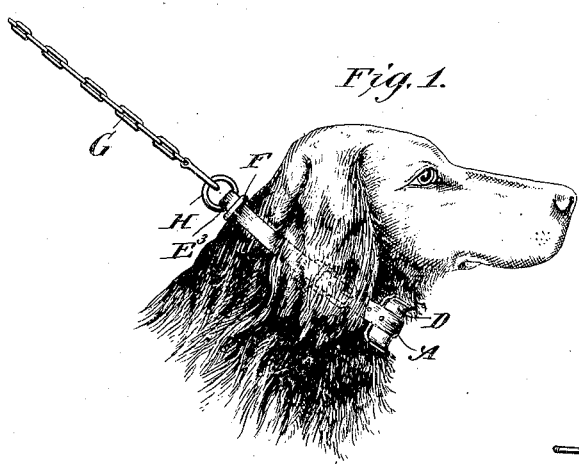
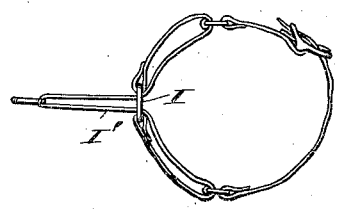
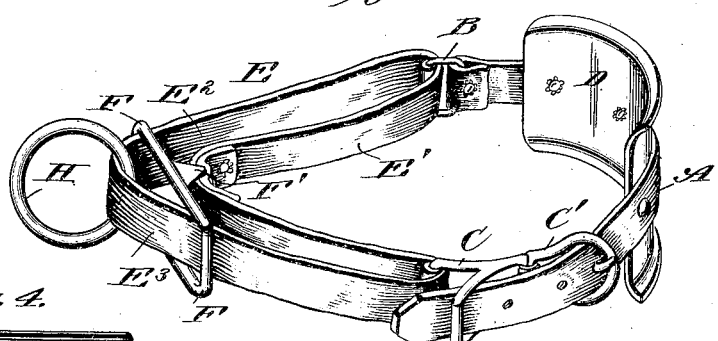
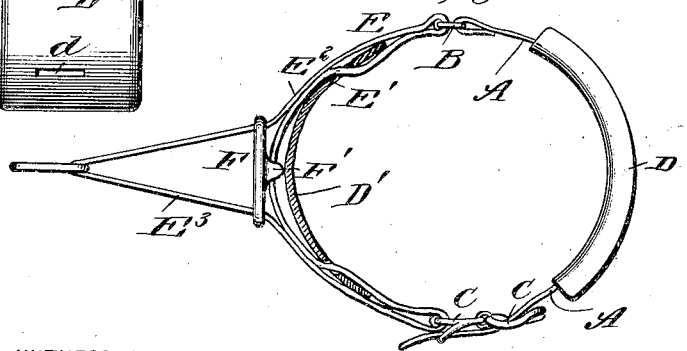
WITNESSES:
INVENTOR
Alex Johnson.
BY
ATTORNEYS No. 770,070.	Patented September 13, 1904.

UNITED STATES PATENT OFFICE.

ALEX JOHNSON, OF WELLSVILLE, OHIO.

COLLAR.

SPECIFICATION forming part of Letters Patent No. 770,070, dated September 13, 1904.

Application filed March 12, 1904. Serial No. 197,760. (No model.)

*To all whom it may concern:*

Be it known that I, ALEX JOHNSON, a citizen of the United States, and a resident of Wellsville, in the county of Columbiana and State of Ohio, have made certain new and useful Improvements in Collars, of which the following is a specification.

My invention is an improvement in collars intended especially for use on dogs and which will when the dog pulls on the chain be contracted in order to exert a pressure to restrain the dog; and the invention consists in certain novel constructions and combinations of parts, as will be hereinafter described and claimed.

In the drawings, Figure 1 is a side elevation of my invention as in use. Fig. 2 is a detail perspective view of the collar. Fig. 3 is a top plan view of the collar. Fig. 4 is a detail view of a modified form of throat-plate; and Fig. 5 is a top plan view of a collar, showing a somewhat different arrangement of the runs of the neck-section from that shown in Figs. 1, 2, and 3.

In carrying out my invention I construct the collar with a throat-section and a neck-section, the latter having inner and outer runs, with a loop on one of the runs through which the other run may be drawn to form a draft portion which may be drawn upon to contract the collar.

As shown in Figs. 1, 2, and 3, the throat-section A is provided at its ends with loops B and C and has between its ends the broad throat-plate D, which latter may be riveted to the section A, as shown in Fig. 2, or I may employ a throat-plate D', such as shown in Fig. 4, and having slots $d$, through which the strap of the section A may be passed. It may be desirable to employ a throat-plate on the neck-section as well as on the throat-section, and in some instances it may be desirable to employ the throat-plate on the neck-section instead of the throat-section, and I have illustrated in Fig. 3 the application of a throat-plate to the neck-section.

The neck-section E is passed through the loops B and C, the latter being preferably provided with rollers to reduce friction, and the said neck-section E has the inner run E' and the outer run $E^2$, the run E' being provided at its middle with a loop F, through which the run $E^2$ is drawn to form the draft portion $E^3$, to which the chain G may be connected, a ring H being supplied on the portion $E^3$ to facilitate the connection with the chain, as will be understood from Figs. 1 and 2. As shown in Figs. 2 and 3 and as preferred, the loop F is secured at its middle at F' to the inner run E' of the neck-section, providing the laterally-projecting portions through which the draft portion $E^3$ of the outer run $E^2$ is drawn, as best shown in Figs. 2 and 3, in the use of the invention. It will be noticed from Figs. 2 and 3 that if the parts be as shown in Fig. 2 and strain be exerted on the draft connection $E^3$ by pulling on the chain G' or by the dog pulling on the collar the draft connection $E^3$ will move outwardly through the loop F and will contract the collar from the position shown in Fig. 2 to that shown in Fig. 3 for the desired purpose.

In Fig. 5 I show a somewhat different arrangement of the loop and of the draft portion of the neck-section. In this construction the loop I is provided on the outer run and the draft portion I' is a portion of the inner run drawn through the said loop I, this being within the broad principles of the construction before described, as in both constructions (shown in Figs. 2 and 5) the neck-section is slidably connected by means of loops with the ends of the throat-section and has inner and outer runs, with a loop in one of said runs through which a draft portion of the other run is movable for the purpose of contracting the collar as desired.

The throat-plate D may be of leather, sheet metal, or other suitable material, and the neck-section of the collar may be made of soft pliable leather, such as calfskin, rawhide, sheep-skin, or other soft material.

It will be understood that my invention will be especially useful with dogs that slip the collar, as the device is self-adjusting and the weight of the dog-chain will regulate the size of the collar and the dog cannot get the collar off, as the harder he pulls the smaller the collar will get, and the dog must cease pulling or will be choked by the contraction of the collar.

Having thus described my invention, what I claim as new, and desire to secure by Letters Patent, is—

1. A collar consisting of a throat-section provided at its ends with loops and a neck-section having inner and outer runs and a loop in one of said runs, one of the runs of the neck-section having a draft portion movable through the loop of the other run.

2. A collar comprising a throat-section, a neck-section slidably connected with the ends of the throat-section and having inner and outer runs, one of the runs of the neck-section being slidable through a loop connected with the other run of the neck-section whereby to form a draft-section for contracting the collar substantially as set forth.

3. A collar comprising a throat-section having loops at its ends, a neck-section provided with a loop through which a double draft portion of the neck-section is movable longitudinally to form a draft portion which may be drawn upon to contract the collar.

4. A collar comprising the throat-section and a neck-section slidably connected with the throat-section and having a connected loop and a draft portion movable through the loop whereby to contract the collar.

5. A collar comprising a throat-section provided at its ends with loops, a neck-section slidable through said loops and having inner and outer runs, and a loop connected with the inner run and through which the outer run may be drawn to form a draft portion for contracting the collar substantially as set forth.

6. A collar comprising a throat-section having a broad throat-plate between its ends and loops at its ends, and the neck-section having inner and outer runs one of which is provided with a loop through which the other run is drawn to form a draft portion which can be drawn upon to contract the collar, substantially as set forth.

7. The collar herein described comprising a throat-section, loops at the ends of the throat-section, a neck-section slidable through said loops and having inner and outer runs, a loop connected at its middle with the inner run and the draft portion of the outer run being drawn through said loop whereby it may be operated to contract the collar substantially as set forth.

ALEX JOHNSON.

Witnesses:
W. A. SNEDIKER,
C. V. SHOUB.